US009607293B2

(12) United States Patent
McMillen et al.

(10) Patent No.: US 9,607,293 B2
(45) Date of Patent: Mar. 28, 2017

(54) METHOD AND SYSTEM FOR ACCOUNT MANAGEMENT AND ELECTRONIC WALLET ACCESS ON A MOBILE DEVICE

(75) Inventors: Glenn Curtiss McMillen, Downington, PA (US); David A. Crake, Newark, DE (US); Thomas P. Akana, Avondale, PA (US); Loren Barton, London (GB); Christine Ann Schuetz, Chadds Ford, PA (US); Garry Lloyd, Northampton (GB); Eric Crozier, Hockessin, DE (US)

(73) Assignee: BARCLAYS BANK PLC, London (GB)

( * ) Notice: Subject to any disclaimer, the term of this patent is extended or adjusted under 35 U.S.C. 154(b) by 907 days.

(21) Appl. No.: 12/955,373

(22) Filed: Nov. 29, 2010

(65) Prior Publication Data

US 2012/0136732 A1    May 31, 2012

(51) Int. Cl.
| | |
|---|---|
| G06Q 20/00 | (2012.01) |
| H04M 3/42 | (2006.01) |
| G06Q 20/10 | (2012.01) |
| G06Q 20/20 | (2012.01) |
| G06Q 20/32 | (2012.01) |
| G06Q 20/34 | (2012.01) |
| G06Q 20/36 | (2012.01) |

(52) U.S. Cl.
CPC ........... *G06Q 20/105* (2013.01); *G06Q 20/20* (2013.01); *G06Q 20/3223* (2013.01); *G06Q 20/3278* (2013.01); *G06Q 20/3578* (2013.01); *G06Q 20/3674* (2013.01)

(58) Field of Classification Search
CPC .............. G06Q 40/00; H04L 9/00; H04L 9/32

USPC ...................................... 705/16, 39
See application file for complete search history.

(56) References Cited

U.S. PATENT DOCUMENTS 7,881,704 B2 * 2/2011 Rivers .................. G06Q 20/108
455/412.1
7,945,512 B2 * 5/2011 Scipioni ................. G06Q 20/04
705/30

(Continued)

FOREIGN PATENT DOCUMENTS

WO    WO 2009/102785    8/2009

OTHER PUBLICATIONS

Kousaridas, Apostolos, George Parissis, and Theodore Apostolopoulos. "An open financial services architecture based on the use of intelligent mobile devices." Electronic Commerce Research and Applications 7.2 (2008): 232-246.*

(Continued)

*Primary Examiner* — Oluseye Iwarere
*Assistant Examiner* — Talia Crawley
(74) *Attorney, Agent, or Firm* — Cowan, Liebowitz & Latman, P.C.; Steven D. Underwood (57) ABSTRACT

A method and system are described that facilitate efficient and secured management of a mobile payment account by an electronic wallet on a user portable electronic device, the electronic wallet for conducting payment transactions with a merchant point of sale terminal over a contactless communications link. In an aspect, the electronic wallet provides for the real-time addition of one or more users authorized to use the mobile payment account associated with the electronic wallet from their own respective portable devices, in a secure and efficient manner.

14 Claims, 9 Drawing Sheets

(56) References Cited

U.S. PATENT DOCUMENTS

| | | | | |
|---|---|---|---|---|
| 8,538,819 B2* | 9/2013 | Murphy | ............... | G06Q 20/20 |
| | | | | 705/16 |
| 9,160,734 B2* | 10/2015 | Raj | ............... | G06F 21/31 |
| 2002/0035539 A1* | 3/2002 | O'Connell | ............ | G06Q 20/02 |
| | | | | 705/39 |
| 2007/0265984 A1* | 11/2007 | Santhana | ............... | G06Q 20/10 |
| | | | | 705/65 |
| 2009/0132415 A1* | 5/2009 | Davis | ............... | G06Q 20/10 |
| | | | | 705/43 |
| 2009/0210308 A1* | 8/2009 | Toomer | ............... | G06Q 20/20 |
| | | | | 705/16 |
| 2012/0095852 A1* | 4/2012 | Bauer | ............... | G06Q 20/105 |
| | | | | 705/16 |
| 2012/0110341 A1* | 5/2012 | Beigi | ............... | G06Q 20/3223 |
| | | | | 713/186 |
| 2014/0222682 A1* | 8/2014 | Dua | ............... | G06Q 20/20 |
| | | | | 705/44 |

OTHER PUBLICATIONS

Blaze, Matt, John Ioannidis, and Angelos D. Keromytis. "Offline micropayments without trusted hardware." Financial Cryptography. Springer Berlin Heidelberg, 2002.*

* cited by examiner

- 75
- 63b
- 61b
- Email
- $ Quick pay
- A Accounts
- Alarm Clock
- Camera
- Contacts

FIG. 5b

- 77
- 76
- Barclaycard ●
- Non-BCUS ○
- Other ○

FIG. 5c

- 79
- 78
- Enter Activation Code
- 12345 Response
- Set PIN

FIG. 5d

- 80
- ○○○○ Set PIN
- ○○○1 Confirm PIN
- UNWIND Secret Word
- OK

FIG. 5e

- 81
- PIN Active! Enter additional information for web servicing
- Social Security Number
- Mother's Maiden Name
- Date of Birth

METHOD AND SYSTEM FOR ACCOUNT MANAGEMENT AND ELECTRONIC WALLET ACCESS ON A MOBILE DEVICE

FIELD OF THE INVENTION

This invention relates to a mobile payment account system, and more particularly to an improved mobile payment application on a mobile device to enable more efficient management of an electronic wallet on the mobile device.

BACKGROUND OF THE INVENTION

Mobile payment account systems are generally known, in which portable electronic devices are configured to provide payment from an electronic wallet. Typically, these portable electronic devices are configured to enable a contactless communication with a merchant Point of Sale (POS) terminal to carry out a payment transaction, for example using near field communication (NFC) technology. As described in the Applicant's co-pending U.S. patent application Ser. No. 12/891,866, entitled "METHOD AND SYSTEM FOR ELECTRONIC WALLET ACCESS", filed Oct. 15, 2010, and U.S. patent application Ser. No. 12/905,419, entitled "MOBILE PAYMENT SYSTEM", filed Sep. 28, 2010, both of which are incorporated herein by reference in their entirety, activated mobile payment account data may be stored in the secure memory of the portable electronic device which can then be used to carry out transactions with the merchant electronic POS terminal via a NFC link.

What is desired is a facility to provide expedient and secured management of users authorized to use the mobile payment account associated with an electronic wallet, directly, entirely and exclusively from the portable electronic device.

SUMMARY OF THE INVENTION

In one aspect of the present invention, a method is provided of facilitating mobile payment account management from an electronic wallet on a first portable device. The method comprises, on the first portable device, storing an electronic wallet comprising data for authorizing a payment transaction from a primary payment account and receiving user input of an additional user authorized to use the primary payment account. An activation code is generated for an additional authorized user, in response to receipt of user input of an additional authorized user. A second portable device stores an electronic wallet comprising data for authorizing a payment transaction from the primary payment account. The method enables payment transactions from the primary payment account to be authorized from the second portable device after receiving user input of the activation code at the second portable device.

In another aspect of the present invention, a system is provided for facilitating mobile payment account management from an electronic wallet on a first portable device. The system comprises a first portable device arranged to store an electronic wallet comprising data for authorizing a payment transaction from a primary payment account. The first portable device is also arranged to receive user input identifying an additional user authorized to use the primary payment account. A middleware server is arranged to generate an activation code for an additional authorized user. A second portable device stores an electronic wallet comprising data for authorizing a payment transaction from the primary payment account, and to receive user input of the activation code. The middleware server and second portable device are further arranged to enable payment transactions from the primary payment account to be authorized from the second portable device after user input of the activation code is received by the second portable device.

In yet a further aspect, there is provided a portable device in the above system, and a computer program arranged to carry out the above method when executed by components of a payment system.

BRIEF DESCRIPTION OF THE DRAWINGS

There now follows, by way of example only, a detailed description of embodiments of the present invention, with references to the figures identified below.

FIG. 3, which comprises

FIG. 4, which comprises

FIG. 5, which comprises FIGS. 5a to 5e, illustrates a sequence of screens displayed by the mobile device to the user during a process of activating a mobile payment account linked to an authorizing user's primary payment account according to embodiments of the present invention; and FIG. 6, which comprises

DETAILED DESCRIPTION OF EMBODIMENTS OF THE INVENTION

Figure 1:
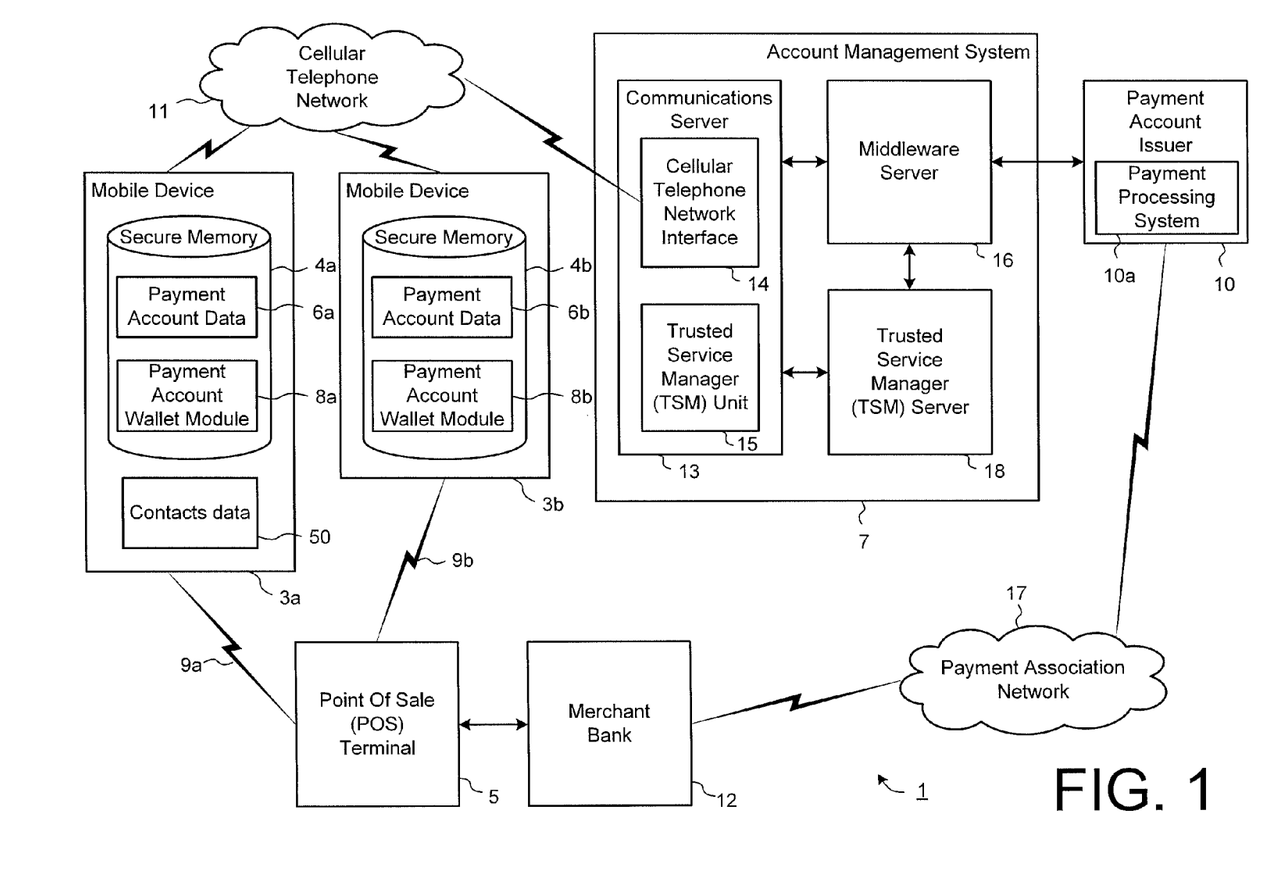
FIG. 1 is a block diagram showing the main components of a mobile payment system according to an embodiment of the invention.

Referring to FIG. 1, a mobile payment system 1 according to an embodiment comprises a plurality of mobile devices 3a, 3b, a merchant's electronic Point of Sale (POS) terminal 5 as commonly known in the field, and an account management system 7 associated with a payment account issuer 10, which communicate electronically with one another. The account management system 7 may provide for mobile payment account creation and activation, transaction authorization, and other related functionalities, as described in the Applicant's above-referenced co-pending U.S. patent application Ser. Nos. 12/891,866 and 12/905,419. As will be described below, the account management system 7 may include a communications server 13 and a Trusted Service Manager (TSM) server 18 for facilitating communication between the middleware server 16 and the mobile device 3. The payment account issuer 10 may include a payment processing (authorization and fraud monitoring) system 10a for authorizing and effecting payment transactions from payment accounts associated with the payment account issuer 10, in response to payment transaction instructions received via a payment association network 17. In this embodiment, the mobile devices 3a, 3b and the electronic POS terminal 5 communicate with one another via a contactless communication link 9a, 9b. As those skilled in the art will appreciate, this contactless communication link 9 may be a near field communication (NFC) link, an infra-red link, an ultra-sonic link, an optical link, a radio frequency (eg. RFID) link, a wireless link such as Bluetooth or Wi-Fi based on the IEEE 802.11 standards, or any other communication link that does not require direct physical contact. The mobile devices 3a, 3b may also communicate with the account management system 7 via a cellular telephone network 11.

As shown in FIG. 1, each mobile device 3 in this embodiment includes a respective secure memory 4 storing payment account data 6 for one or more mobile payment accounts that have been set up on the mobile device 3. The secure memory 4 may be a Universal Integrated Circuit Card (UICC) secure element, any other secure memory configurations such as embedded secure element chips, or as part of an peripheral accessory device to the mobile device such as a micro Secure Digital card—otherwise known as a micro SD card, as are known in the art. It is appreciated that other forms of mobile handset software and/or hardware may be implemented to provide built-in secure electronic wallet functionality for accessing the secure memory 4, including encryption and decryption of the payment account data 6 as necessary. The mobile device 3 may be configured with built-in functionality providing access to secure memory on the Subscriber Identity Module (SIM) card in the mobile device 3. In the present embodiment, payment account data 6a for a mobile payment account that is securely stored in a first mobile device 3a includes data identifying a user's account at a payment account issuer 10 from which funds can be transferred to the merchant bank to complete a transaction, via a payment association network 17. The payment account data 6 may additionally include data defining an amount of pre-paid funds that have been transferred from the user's payment account issuer 10 to that mobile payment account. In this way, the electronic wallet includes a payment account that may be linked to multiple funding sources, such as a pre-paid account, deposit account and/or credit account. As an alternative, the electronic wallet may include a plurality of mobile payment accounts, each linked to a respective funding source.

As will be described below, the user associated with the first mobile device 3a may be the primary account holder and owner of the account associated with the mobile payment account stored on the first mobile device 3a, and may wish to add a user associated with a second mobile device 3b as an additional authorized user of the same account. In an embodiment, the mobile device 3a is configured to enable the account owner to select a contact person from contacts data 50 stored on the mobile device 3a as an authorized user of a selected mobile payment account. It is commonly known to store such contacts data 50 on a mobile device 3, such as in the form of an electronic phone book or address book, storing data for each contact person identifying the contact's name and mobile directory number. In response to a received request from the mobile device 3a associated with the account owner to add a selected contact person as an authorized mobile account user, the account management system 7 may be arranged to verify the selected contact person and then to carry out a mobile payment account provisioning and/or activation process with the second mobile device 3b associated with the authorized user. Verification of the authorized user involves prompting the authorized user to enter an activation code that is generated by the account management system 7 and securely communicated to the account owner. The account owner may then communicate the activation code to the authorized user by any desired transmission means, for example, face to face which would be highly secure, or via other communication channels such as Short Message Service (SMS) messaging over the cellular telephone network or email via the Internet, which are external to the mobile payment account management system. In this way, an account owner is able to safely, securely and expediently allow another user to use the same account on their own mobile device. The process is advantageously carried out through the account owner's mobile device, and provides a level of security through the requirement of an activation code which is never transmitted between the mobile devices 3a, 3b via the account management system 7 as part of the add authorized user process, thus preventing identity theft and fraudulent access to the mobile payment account from a hacker eavesdropping on the data communications between the first mobile device 3a and the second mobile device 3b. Additionally, the add authorized user process is more efficient than known processes for adding an additional account holder to a payment account as the process does not require time-consuming identification and verification procedures involving manual intervention by personnel at the payment account issuer.

The mobile device 3 also includes a payment account wallet application module 8 storing processing instructions used to control the operation of the mobile device 3, to facilitate creation and management of one or more mobile payment accounts on the mobile device 3 and to handle the process of conducting a transaction with a merchant via the electronic POS terminal 5 using a mobile payment account on the mobile device 3, to effectively transfer funds from the mobile payment account on the mobile device 3 or an associated payment account issuer 10 to the merchant. As those skilled in the art will appreciate, the payment account wallet application module 8 may be provided as one or more software components of an operating system running on the mobile device 3 or as one or more separate software applications installed on the mobile device 3. Such software applications may be configured to run as background applications on the mobile device 3 that monitor receipt of message or events and activate upon receipt of appropriate messages or events so as to carry out the above operations. The software applications may also be launched by the user. Alternatively, the payment account wallet application module 8 may be stored in the secure memory 4, and maybe loaded into a virtual machine of the mobile device 3 to provide the functionality of the present embodiment.

A secure mobile payment account provisioning and activation process may be carried out between the mobile device 3 and the account management system 7, as described in the Applicant's above referenced co-pending U.S. patent application Ser. No. 12/891,866. The activated mobile payment account data stored in the secure memory 4 of the mobile device 3 can then be used to carry out transactions with a merchant electronic POS terminal 5 via the contactless communication link 9, whereby a requested amount of funds can be transferred from the mobile payment account stored in the mobile device 3 to the merchant's bank 12. Techniques and protocols for implementing the authorization and transfer of funds between the merchant POS terminal 5, the merchant bank 12, and the payment account issuer 10 via the payment association network 17, are commonly known and will be apparent to those skilled in the art.

The account management system 7 in the mobile payment system 1 will now be described in more detail with reference to FIG. 1, which shows the elements of the account management system 7 used in embodiments of the present invention. As shown, the account management system 7 may include a communications server 13, a middleware server 16, and a TSM server 18, which communicate electronically with one another. In this embodiment, the servers communicate with one another via secure network links over a private Local Area Network (LAN), a Virtual Private Network (VPN) connection, or other dedicated secure connection. It is appreciated that, although the components of the account management system 7 in this embodiment are provided as separate servers, one or more of the servers could be provided as software and/or hardware modules in the same server.

As shown in FIG. 1, data may be communicated between the mobile device 3 and the middleware server 16 over the cellular telephone network 11 via a cellular telephone network interface 14 of the communications server 13. The TSM server 18 may perform logical data preparation of the data to be communicated to the mobile device by forming appropriate commands to be written to the secure memory 4 of the mobile device 3. It will be appreciated, the precise form of the data may depend on the particular implementation of the secure memory 4 of the mobile device 3 and/or the payment association scheme program for facilitating payment. The TSM server 18 may also perform encryption of the data, for example, of the sensitive payment account information in the mobile payment account data 6 such as payment keys. The TSM server 18 may then pass the encrypted data to the mobile device 3 via the communications server 13 and the cellular telephone network 11.

The communications server 13 may also include a separate TSM unit 15 for securely routing the data to the mobile device 3, as will be known to those skilled in the art. In the above example, the TSM unit 15 in the communications server 13 would not access any of the sensitive portions of the encrypted data that is routed to the mobile device 3 via the cellular telephone network interface 14.

Figure 2:
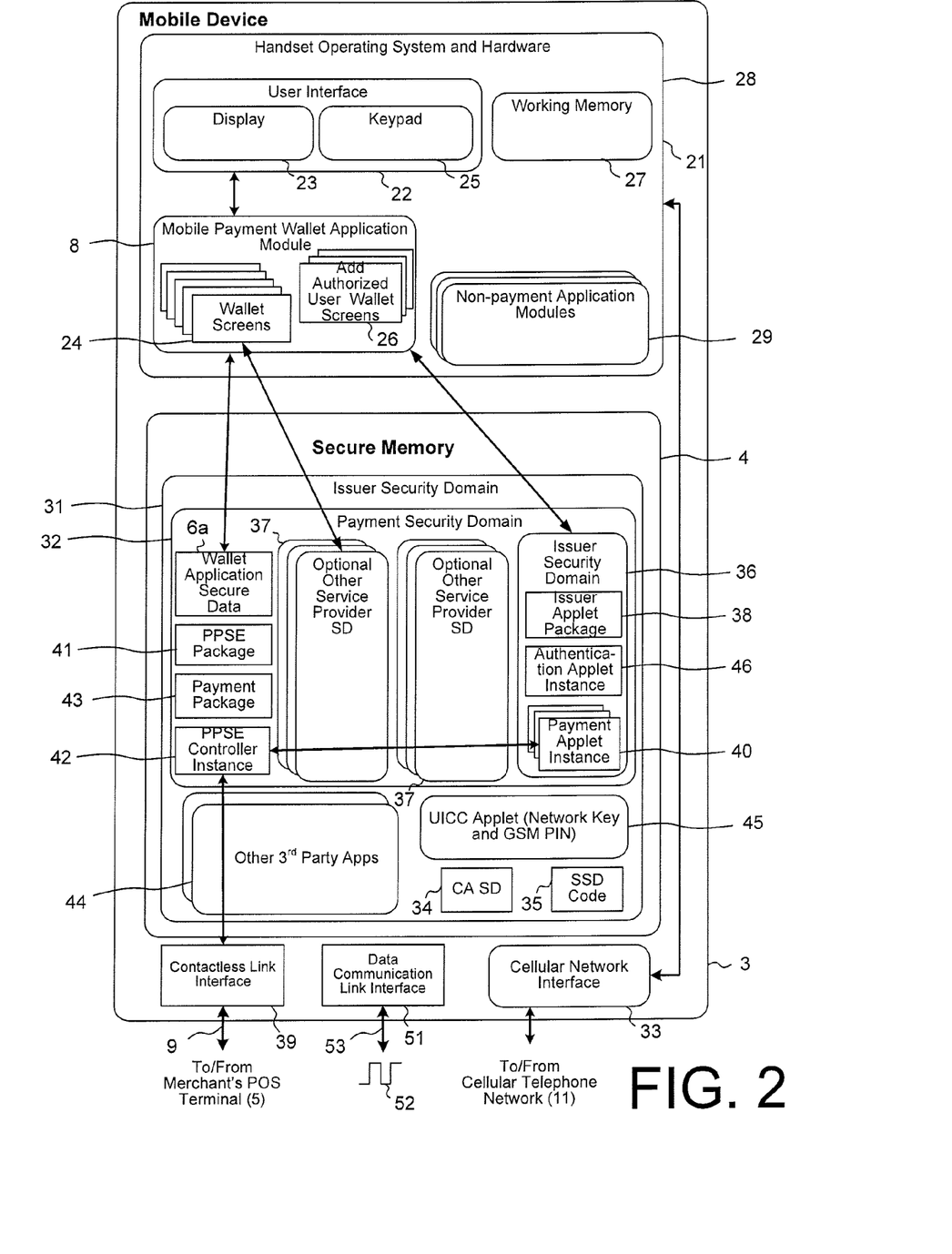
FIG. 2 is a block diagram showing the main hardware and/or software elements of a mobile device shown in FIG. 1 according to an embodiment.

FIG. 2 shows the elements of a mobile device 3 according to an embodiment of the present invention. In this embodiment, the mobile device 3 is a mobile handset. As shown in FIG. 2, the mobile handset operating system and hardware includes a user interface 22 arranged to process inputs from a keypad 23 and to control output on a display 25. It is appreciated that the keypad 23 and display 25 may be provided as separate hardware entities of the mobile device 3 or may alternatively be provided as an integrated entity as a touch sensitive display screen user interface element as is known in the art. The mobile device 3 may also include components included in commonly known mobile handsets, such as a microphone, an earpiece speaker, camera and controller, GPS receiver etc., which are not shown for clarity. A working memory 27 is provided for use by the handset operating system and hardware units 21.

Software and data may be transferred via the cellular network interface 33 or via a different data communication link interface 51 in the form of signals 52, which may be electronic, electromagnetic, optical, or other signals capable of being received by the data communication link interface 51 via a communication path 53 that carries the signals 52 and may be implemented using wire or cable, fiber optics, a physical phone line, a wireless link, a radio frequency link, or any other suitable communication channel. For instance, communication path 53 may be implemented using a combination of channels. It is appreciated that the communication path 53 may be linked or merged with the communication path from the cellular network interface 33 to the cellular telephone network 11.

As mentioned above, the mobile device 3 includes a secure memory 4. The mobile device 3 is operable to receive the payment account data 6 and activation request messages from and send validation messages to the account management system 7 via a cellular telephone network interface 33 and the cellular telephone network 11, and to store the received payment account data 6 in the secure memory 4. The mobile device 3 is also operable to receive transaction authorization request messages from and send authorization messages to the merchant's POS terminal 5 via a contactless communications link interface 39 and the contactless communication link 9. It is appreciated that communication between a POS terminal 5 and the mobile device 3 may involve transmission of data in a single direction from the mobile device 3 to the POS terminal 5, depending on an implemented protocol (such as the well known protocol used by the Discover Zip cashless payment system).

The mobile device 3 also includes a payment account wallet application module 8 as mentioned above, which stores processing instructions used to control the operation of the mobile device 3 to perform various mobile payment account processes. The payment account wallet application module 8 may include an account creation sub-module and an account activation sub-module which store processing instructions to create a request for a new mobile payment account if desired and to carry out a secured account validation and activation process, in response to user input from the keypad 23, as described in the above-referenced Applicant's co-pending U.S. patent application Ser. No. 12/891,866. The payment account wallet application module 8 may also include a transaction authorization sub-module which stores processing instructions used to control the operation of the mobile device 3 to carry out and authorize a transaction in response to user input from the user interface 22, for example as described in the above-referenced Applicant's co-pending U.S. patent application Ser. No. 12/905,419. The mobile payment wallet application module 8 may be configured to store a plurality of wallet screens 24 which may be output on the display 23 of the user interface 22 to facilitate user interaction with the sub-modules of the mobile payment wallet application module 8. One wallet screen may be a main menu displaying a list of user selectable options for accessing and managing payment account data 6 of a selected mobile payment account stored on the mobile device 3. Another plurality of wallet screens in the wallet application module 8 are provided as "add authorized user" wallet screens 26 which may be displayed in response to user selection of an option to add an additional user authorized to use the associated mobile payment account to conduct payment transactions, as will be described in more detail below. The mobile device 3 may also store one or more non-payment application modules 29 including processing instructions used to control the operation of the mobile device 3 to perform other non-payment related processes.

Also schematically illustrated in the exemplary embodiment of FIG. 2 are pluralities of security domains which may be implemented in the secure memory 4 of the mobile device 3. The security domains serve to segment the management and accessibility of various parties' functionality and sensitive data as will be apparent to those skilled in the art. As shown in FIG. 2, an issuer security domain 31 may include a payment security domain 32, a Controlling Authority (CA) security domain 34, and a Supplementary Security Domain (SSD) code 35. The payment security domain includes wallet application secure data 6a, which includes the payment account data 6 and other data for use by the mobile payment wallet application module 8. The payment security domain may also include an issuer security domain 36 and one or more optional other service provider security domains 37. The issuer security domain 36 may include an issuer applet package 38, an authentication applet instance 46, and one or more payment applet instances 40 which enable the transaction processing functionality using an activated mobile payment account. The payment security domain 32 may also include a Proximity Payment System Environment (PPSE) package 41, a PPSE controller instance 42 for facilitating the transaction processing functionality between the payment applet instances 40 and the contactless communications link interface 39, and a payment package 43.

The mobile device 3 may also include one or more other third party application modules 44 stored in the secure memory 4, for example an application module related to third party loyalty scheme. The secure memory 4 may also store a UICC applet 45 which is an application to manage and hold the mobile network operator's functionality and secure information, such as a network key and GSM (Global Systems for Mobile Communications) PIN (Personal Identification Number).

A brief description has been given above of the components forming part of the mobile payment system 1 of this embodiment. A more detailed description of the operation of these components in this embodiment will now be given with reference to the flow diagram of FIG. 3, which comprises FIGS. 3a to 3d. FIGS. 3a to 3d provide an example computer-implemented process for adding an authorized user of a selected mobile payment account using the mobile device 3 configured with one or more activated mobile payment accounts. Reference is also made to FIG. 4, which comprises FIGS. 4a to 4g, schematically illustrating exemplary display screens that may be presented to the primary account owner on the mobile device 3a in the process of adding an authorized user.

Figure 3A:
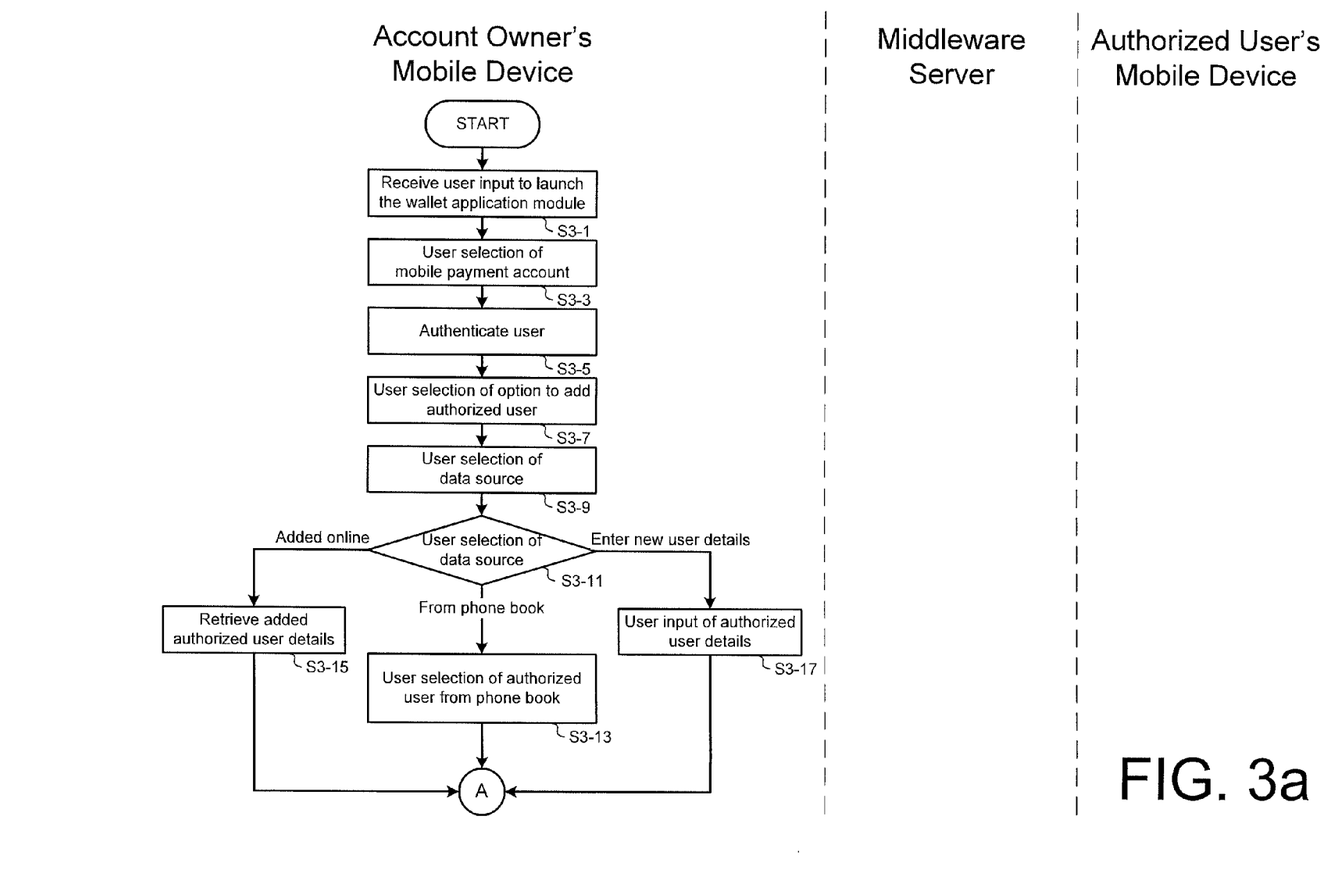
FIGS. 3a to 3d, is a flow diagram illustrating the main processing steps performed by the mobile device of FIGS. 1 and 2 in a process for adding an authorized user according to an embodiment.
Figure 4A:
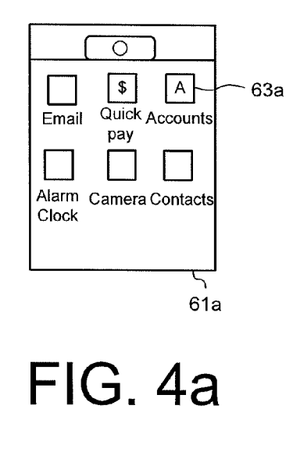
FIGS. 4a to 4g, illustrates a sequence of screens displayed by the mobile device to the user during the process of adding an authorized user according to embodiments of the present invention.
Figure 4B:
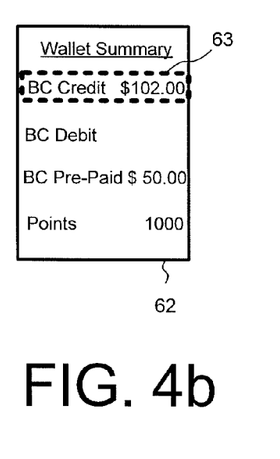

As shown in FIG. 3a, the process begins at step S3-1 where the mobile device 3a of the account owner receives user input to launch the mobile payment wallet application module 8. FIG. 4a shows an example user interface 61a of the account owner's mobile device 3a for enabling a user (the account owner) to launch the mobile payment wallet application module 8 by selection of a respective application icon 63a displayed by the handset operating system 28. Many other forms of user interface are possible depending on the particular mobile device used to implement the present embodiment. After the user has launched the wallet application module 8, the mobile device 3a receives, at step S3-3, user selection of a mobile payment account stored on the mobile device 3a, for example via a wallet summary screen 62 displayed by the mobile device 3a as schematically illustrated in FIG. 4b. In the example shown in FIG. 4b, four mobile payment accounts are stored in the electronic wallet, a "BC Credit" mobile payment account associated with a credit account at a payment account issuer 10, a "BC Debit" mobile payment account associated with a debit account at a payment account issuer 10, a "BC Pre-Paid" mobile payment account linked with an account at a payment account issuer 10 and containing a transferred amount of funds, and a "Points" mobile payment account linked with a points based payment account at a payment account issuer 10. The wallet summary screen 62 may be configured to display a retrieved balance of one or more of the listed mobile payment accounts. The user may scroll through the list of displayed mobile payment accounts to highlight and select a desired mobile payment account 63.

Figure 4C:
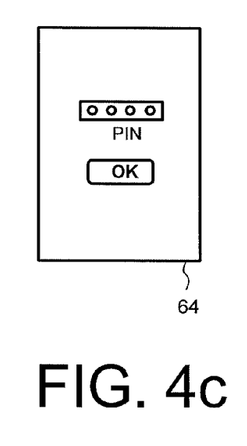
Figure 4D:
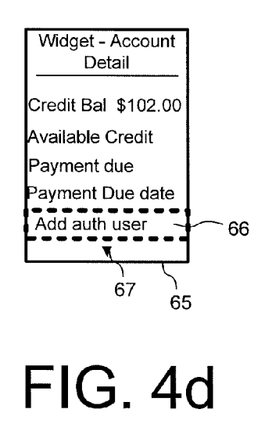
Figure 4E:
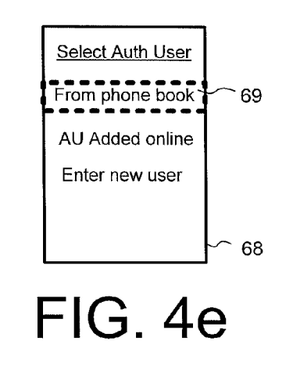

In response to the user selection of a mobile payment account at step S3-3, the mobile device 3a may be configured to authenticate the user at step S3-5 by prompting for input of a PIN to verify the identity of the account owner, as will be apparent to the skilled person. An exemplary PIN prompt and input screen 64 is shown in FIG. 4c. Once the user has been authenticated by the wallet application module 8, the mobile device 3a may display an account detail wallet screen 65 displaying a plurality of user selectable options for accessing information about and/or managing the selected mobile payment account. As shown in the exemplary screen in FIG. 4d, the account detail wallet screen 65 may display the type of account (Credit), the balance ($102.00), and a plurality of user selectable options including checking the available credit for the mobile payment account, checking the date when payment is due, and adding an authorized user for the selected mobile payment account as indicated by the highlighted menu item 66. A further indication, such as an arrow 67, may be displayed to indicate that additional selection options are available for managing the selected mobile payment account. Accordingly, at step S3-7, the mobile device 3a receives a user selection of the menu option to add an authorized user for the selected mobile payment account.

Figure 4F:
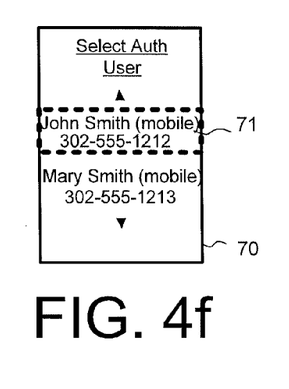

At step S3-9, the mobile device 3a may display a first add authorized user wallet screen 68 displaying a plurality of user selectable options for choosing a data source for selecting an authorized user. As shown in the exemplary screen 68 in FIG. 4e, the select authorized user data source wallet screen 68 may display the user selectable options "AU Added online" to select an external database as the data source, or "From phonebook" to select the contacts data 50 as the data source. A further option "Enter new user" is also provided to enable the user to input the data as a new data source. Accordingly, at step S3-11 the user selects one of the displayed options. If at step S3-11, the user selects the "From phonebook" option, as indicated by the highlighted menu item 69 in FIG. 4e, then the process proceeds to step S3-13 where the mobile device 3a displays a further add authorized user wallet screen 26 to enable user selection of an authorized user from the contacts data 50 stored on the mobile device 3a. An exemplary display screen 70 is shown in FIG. 4f, where the user has highlighted 71 one of the contacts "John Smith (mobile)" and that person's associated Mobile Directory Number (MDN) from the list of contacts. Alternatively, if the added online option is selected at step S3-11, then the process proceeds to step S3-15, where the mobile device 3a retrieves details for an authorized user as previously added via an external online interface as will be apparent to those skilled in the art. If the enter new user details option is selected instead at step S3-11, then the process proceeds to step S3-17 where the mobile device may display a further add authorized user wallet screen 26 to prompt for and receive user input of details, such as the name and MDN of an authorized user.

Figure 3B:
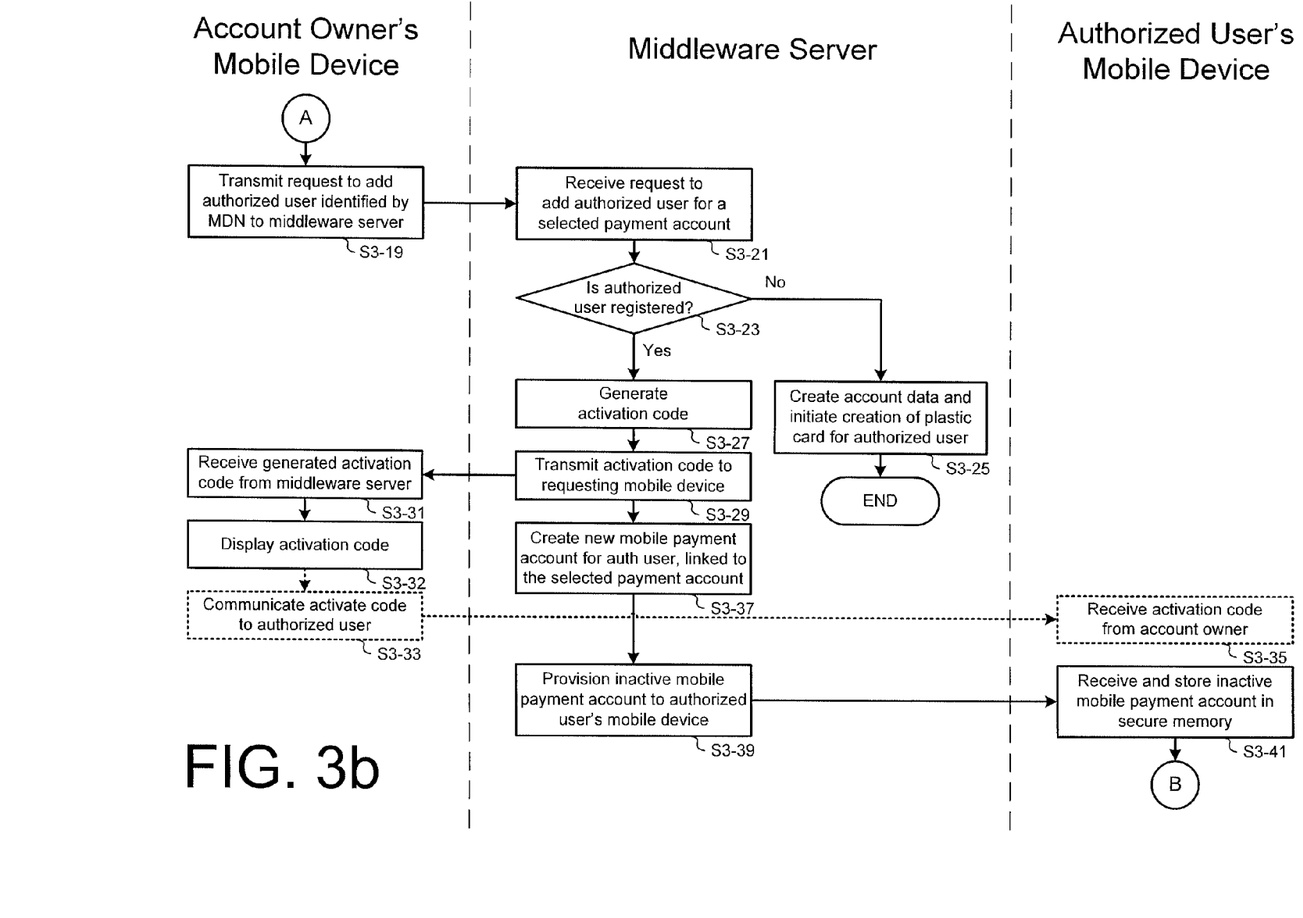

Referring now to FIG. 3b, once the user has selected an authorized user from a data source or entered details of an authorized user, then at step S3-19, the mobile device 3a generates a request to add the authorized user and transmits the request to the middleware server 16 of the mobile payment account management system 7. It is appreciated the request will include data identifying the user to be added as an authorized user of the mobile payment account, the data including the MDN of the authorized user. However, and in accordance with an alternative embodiment, other forms of data may instead be used to identify the authorized user that may suitably be used by the account management system 7 to identify a mobile device 3*b* associated with the authorized user, such as the unique International Mobile Equipment Identity (IMEI) of the mobile device 3*b*. Accordingly, at step S3-21, the middleware server 16 receives the request to add an authorized user for a mobile payment account from the account owner's mobile device 3*a* via the communications server 13 of the account management system 7.

At step S3-23, the middleware server 16 may check if the authorized user identified in the request is registered with the account management system 7. This may involve checking that the authorized user is associated with a mobile device 3*b* that is configured with the mobile payment account wallet application module 8 and operable to communicate securely with the account management system 7. This check may be performed based, on the MDN associated with the authorized user. If at step S3-23, the middleware server 16 determines that the authorized user identified in the request is not registered with the account management system 7, or is not associated with a mobile device enabled for conducting mobile payment transactions, then at step S3-25, the account management system 7 may proceed to create new account data for the authorized user and initiate creation of a plastic card for the authorized user. Alternatively, the account management system 7 may be arranged to transmit a message to a mobile device 3*b* associated with the authorized user with the mobile payment account wallet application module 8 or instructions to configure the mobile device 3*b* to enable mobile payment transactions from that device. However, if at step S3-23 the middleware server 16 determines that the authorized user is registered with the account management system 7 and is associated with a suitably configured mobile device 3*b*, then at step S3-25, the middleware server 16 generates an activation code for this add authorized user process. The activation code may be generated randomly or pseudo-randomly using any known random code generation technique, and is temporary in nature. The generated activation code is then transmitted by the middleware server 16, at step S3-29, to the account owner's mobile device 3*a*.

Figure 4G:
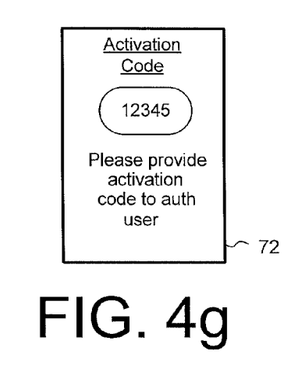

At step S3-31, the activation code is received at the account owner's mobile device 3*a*, which outputs the received activation code at step S3-32 on a wallet screen 72 as schematically shown in FIG. 4*g*. The account owner may then communicate, at step S3-33, the activation code to the authorized user by any desired transmission means, for example face to face, by SMS messaging over the cellular telephone network or email via the Internet. At step S3-35, the activation code is received by the authorized user at the authorized user's mobile device although this is not necessary. In preferred embodiments, the transmission path over which the activation code is communicated from the account owner to the authorized user is separate from the communication paths of the mobile payment system 1. Therefore, steps S3-33 and S-35 are shown as dashed lines in FIG. 3*b*, to indicate that these steps are preferably performed external to the mobile payment system 1 of the present invention.

After the middleware server 16 has transmitted the activation code to the account owner's mobile device at step S3-29, then at step S3-37, the middleware server 16 may be arranged to create a new mobile payment account for the authorized user, the new mobile payment account being linked to the selected payment account of a payment account issuer 10 as identified in the add authorized user request. At step S3-39, the middleware server 16 provisions the inactive mobile payment account data 6*b* to the authorized user's mobile device 3*b* identified by the details provided in the request. The inactive mobile payment account data 6*b* is received at the authorized user's mobile device 3*b* at step S3-41 and stored in the secure memory 4*b*. This process of creating, provisioning and securely storing inactive mobile payment account data for a mobile device is discussed in more detail in the Applicant's above-referenced co-pending U.S. patent application Ser. No. 12/891,866.

Figure 3C:
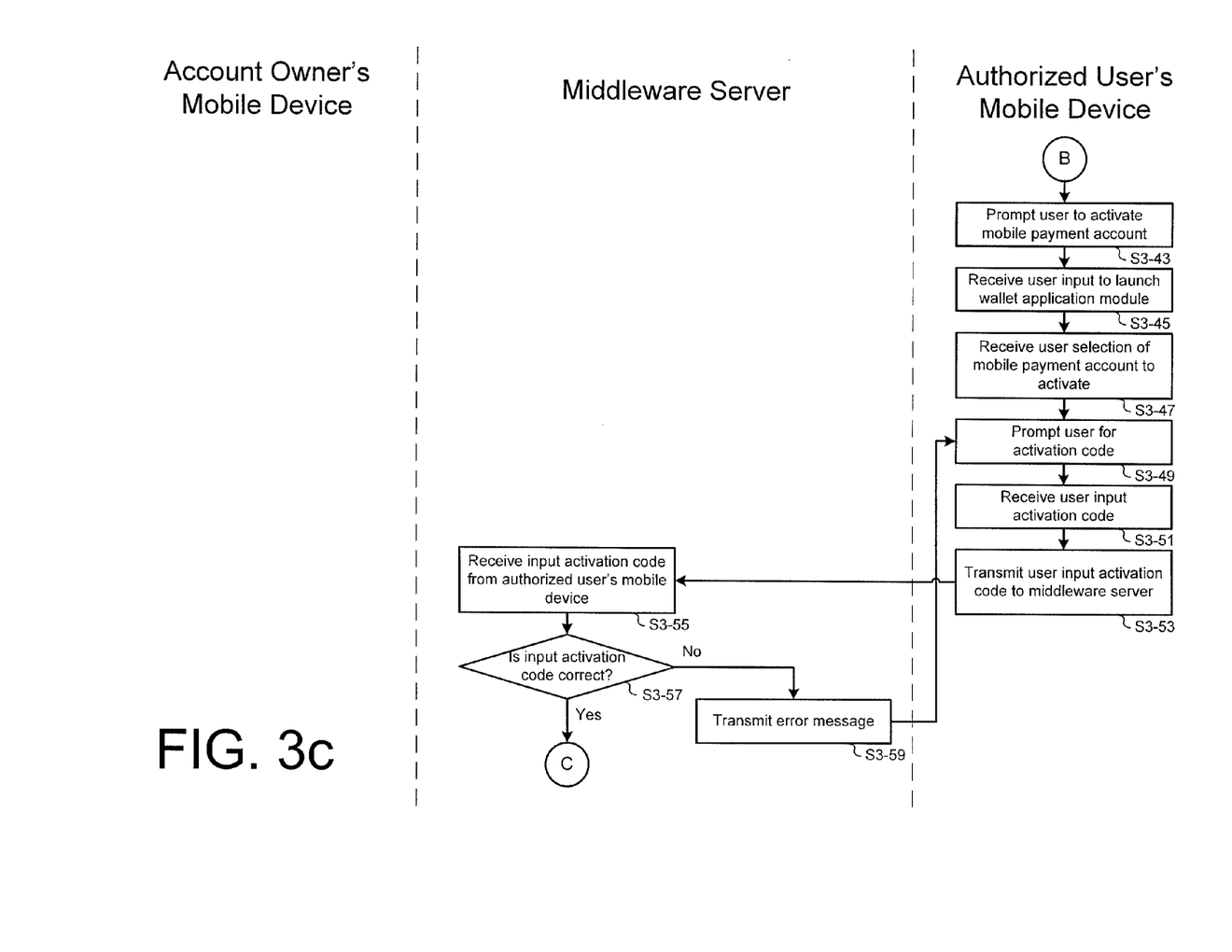
Figure 3D:
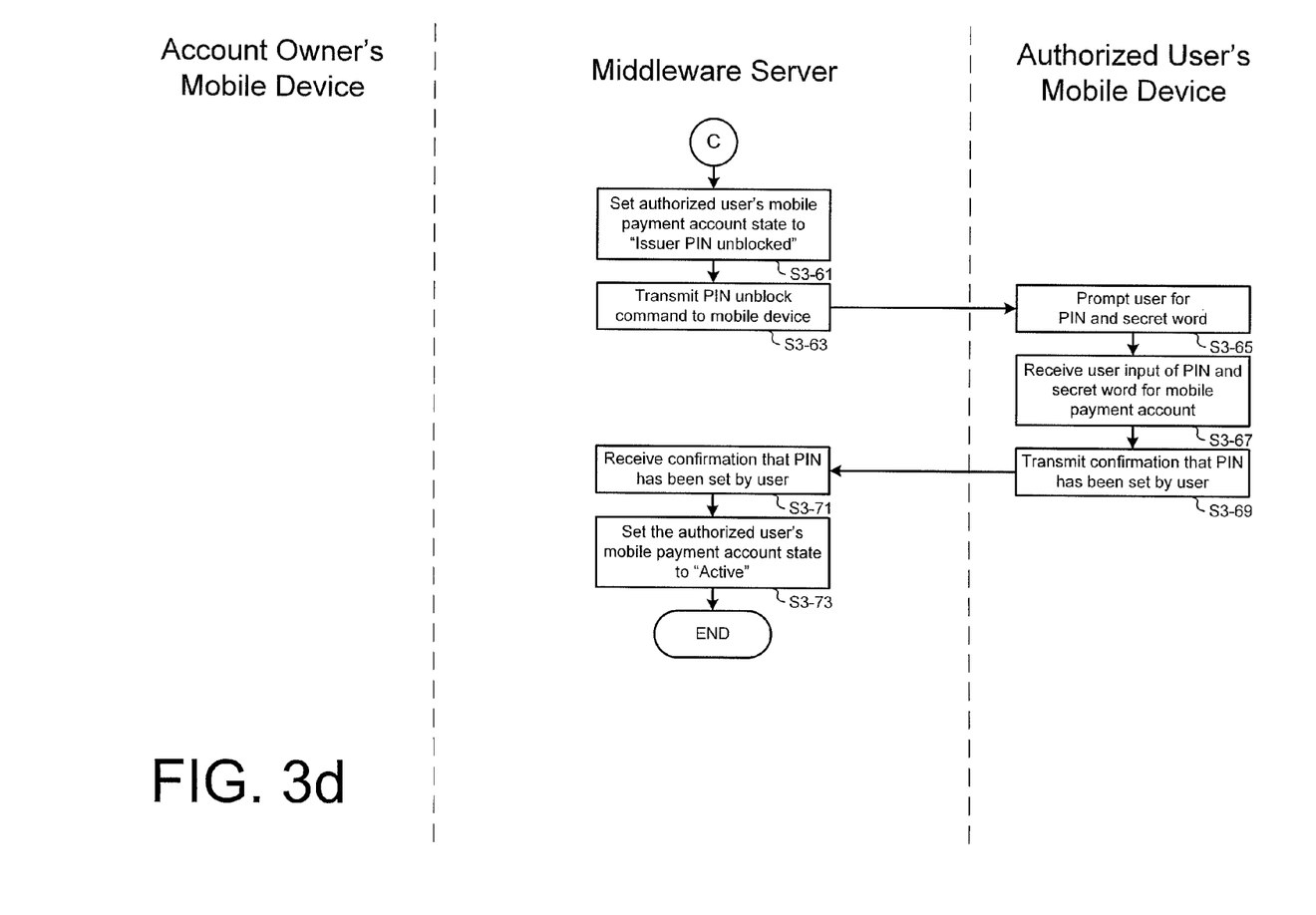

The process of activating a new mobile payment account linked to the primary account will now be described with reference to FIG. 3*c*. Reference is also made to FIG. 5, which comprises FIGS. 5*a* to 5*e*, schematically illustrating exemplary display screens that may be presented to the authorized user on the mobile device 3*b* in the activation process. Once the inactive mobile payment account data 6*b* is stored in the secure memory 4*b*, the authorized user's mobile device 3*b* notifies the authorized user that a new mobile payment account is ready for activation at step S3-43. As shown in FIG. 5*a*, the authorized user's mobile device 3*b* may display an indication 75 over an application icon 63*b* in the user interface 61*b* displayed by the handset operating system 28, as the notification that a provisioned mobile payment account is available for activation. It is appreciated that that many other forms of user interface and indication are possible depending on the particular mobile device used to implement the present embodiment. At step S3-45, the mobile device 3*b* of the authorized user receives user input to launch the mobile payment wallet application module 8.

After the user has launched the wallet application module 8 of the mobile device 3*b*, a wallet screen 24 may be provided to display the inactive mobile payment account or a list of inactive mobile payment accounts awaiting activation as shown in the exemplary display screen 76 in FIG. 5*b*. Accordingly, at step S3-47, the mobile device 3*b* receives a user selection 77 of an inactive mobile payment account stored in the secure memory 4 of the authorized user's mobile device 3*b*. In response, the mobile device 3*b* displays at step S3-49 a subsequent display screen 78 as shown in FIG. 5*c*, to prompt the authorized user to input the activation code for the selected mobile payment account. This is the activation code that was generated by the middleware server 16 in response to receiving the "add authorized user" request, transmitted to the account owner's mobile device 3*a*, and communicated by the account owner to the authorized user, as described above. At step S3-51, the mobile device 3*b* receives the user input activation code via a text input field 79 of the display screen 78, and at step S3-53, the user input activation code is transmitted by the mobile device 3*b* to the middleware server 16, via the communications server 13 of the account management system 7.

At step S3-55, the middleware server 16 receives the activation code as input by the authorized user to the mobile device 3*b* and compares the received user input activation code to the previously generated activation code as transmitted to the authorized user's mobile device 3*a*, at step S3-57. If the middleware server 16 determines that the two codes do not match, then the user input activation code is not correct and in response, the middleware server 16 may transmit an error message back to the authorized user's mobile device 3*b* at step S3-59. In such an embodiment, the authorized user's mobile device 3*b* may be configured to display the error message and return to step S3-49 where the user is prompted for the correct activation code. On the other hand, if the middleware server 16 determines at step S3-57 that the user input activation code is correct, then at step S3-61, the middleware server 16 may set the account state of the authorized user's mobile payment account that is linked to the primary account to "Issuer PIN unblocked" to indicate that the authorized user has been verified (by input of the correct activation code, which will only be known to the account owner and the authorized user) and that the mobile payment account can be configured for activation and use by the authorized user on the mobile device 3b. Therefore, at step S3-63, the middleware server 16 transmits a PIN unblock command to the authorized user's mobile device 3b, and may also transmit a message to the payment account issuer 10 with the state of the mobile payment account.

In response to receiving the PIN unblock command, the mobile device 3b displays a wallet display screen 80 at step S3-65 to prompt the authorized user to set a PIN (or passcode) for the mobile payment account. As shown in FIG. 5d, this wallet display screen 80 may prompt the authorized user to input the PIN a second time as confirmation of the correct PIN being set, and may also prompt for a secret word to be set, which may be used as a user verification in the event that the user wishes to recover a forgotten PIN. As those skilled in the art will appreciate, the PIN or passcode may be used for verifying or authenticating the user before effecting payment transactions from the associated mobile payment account, or before any servicing of the mobile payment account on the mobile device 3b. At step S3-67, the mobile device 3b receives and stores the user input PIN and secret word as mobile payment account data for the activated mobile payment account in the secure memory 4b of the mobile device 3b. At step S3-69, the mobile device 3b then transmits a confirmation message back to the middleware server 16 to inform the account management system 7 that the PIN has been set by the user. In response to receiving the confirmation at step S3-71, the middleware server 16 automatically activates the authorized user's mobile payment account by setting the state to "Active". The authorized user is then able to use the activated mobile payment account in the electronic wallet of the authorized user's mobile device 3b, that is linked to a primary account belonging to another user, to carry out contactless payment transactions as described in the Applicant's above referenced co-pending U.S. patent application Ser. Nos. 12/891,866 and 12/905,419.

It will be understood that embodiments of the present invention are described herein by way of example only, and that various changes and modifications may be made without departing from the scope of the invention.

In the embodiments described above, the mobile payment account is provisioned on a mobile handset which communicates with the account activation system via a cellular telephone network. It is appreciated that instead of a mobile handset other portable electronic devices configured for contactless payment with a merchant electronic POS and having suitable input and display means, may be adapted to carry out the functionality of real time adding of an authorized user to the payment account and/or activation of a dependent mobile payment account, as described in the above embodiments. Additionally, it is appreciated that the portable electronic device may be configured to communicate with the account activation system via any other form of communication channel, such as a wired or wireless network connection, a Bluetooth connection, or the like. Alternatively, the mobile payment account data may be provisioned on the portable electronic device by means of data transfer via any suitable data communication path or by way of a computer readable medium.

In the embodiment described above, the mobile device stores a plurality of application modules (also referred to as computer programs or software) in memory, which when executed, enable the mobile device to implement embodiments of the present invention as discussed herein. It is appreciated that the software may be stored in a computer program product and loaded into the mobile device using any known instrument, such as removable storage disk or drive, hard disk drive, or communication interface, to provide some examples.

In the embodiments described above, the account management system is described as a separate entity to the payment account issuer and the associated payment processing system. It is appreciated that the account management system may be provided as an integral part or sub-system of the payment account issuer and/or payment processing system.

In the embodiments described above, the mobile payment wallet application module on a mobile device provides a wallet screen for an account owner to select a contact person from the contacts data (phone book) of the account owner's mobile device. It is appreciated that the contacts data may be adapted to include data indicating whether or not a contact person is registered with the account management system or otherwise associated with a mobile device enabled to carry out contactless payment transactions with a mobile payment account. In such an alternative embodiment, the wallet screen may be configured to display a list of only those contact persons who are suitable for authorized use of the payment account via a provisioned and activated mobile payment account on the authorized user's mobile device.

In the embodiments described above, an additional user is authorized to use the primary payment account to conduct payment transactions from the authorized user's mobile device. In an alternative embodiment, the account management system 7 and the authorized user's mobile device may be further configured to enable the authorized user to perform predetermined selected account servicing tasks on the primary payment account in addition to conducting payment transactions from the mobile payment account, via other service channels (web, phone, IVR etc). It is appreciated that authorizing such additional servicing may require establishing and confirming additional credentials from the authorized user. Accordingly, in this alternative embodiment, the wallet application module 8 on the authorized user's mobile device 3b may be configured to display a further wallet screen 24 to prompt the authorized user for additional information which may be used for multi-channel servicing. As shown in the exemplary display screen 81 in FIG. 5e, the authorized user may be prompted to securely input sensitive information such as the user's social security number, date of birth, and mother's maiden name, after the PIN has been set and activated. This input information may be securely transmitted by the mobile device 3b to the account management system 7 and utilized in different environments provided for configuration and access by the authorized user to selected servicing options for the mobile payment account, such as via the mobile device 3b, a web-based interface or a conventional telephone call center, etc.

In the above embodiments, the process for confirming that the authorized user has input a correct activation code involves communication between the authorized user's mobile device and the middleware server in response to receipt of the user input activation code to the authorized user's mobile device. It is appreciated that as an alternative the activation code may instead be generated by the middleware server and transmitted to the authorized user's mobile device prior to receipt of the user input activation code by the authorized user's mobile device. The activation code generated by the middleware server could be provided as a PIN in the inactive mobile payment account data that is communicated to the authorized user's mobile device for account provisioning as described above. The generated activation code transmitted as a PIN in this way may be a one time PIN whereby user input of the activation code to the authorized user's mobile device forces a PIN reset upon successful entry of the activation code. In this way, the communication process for authenticating the additional authorized user is simplified because the generated activation code is stored locally on the authorized user's mobile device and need not be verified against the middleware server directly. Additionally, rather than the process requiring communication back to the middleware server to check and force a PIN entry state (steps S3-61 and S3-63), the process in this alternative embodiment may proceed directly from confirming, by the authorized user's mobile device, that the user input activation code matches the one-time PIN to the step of prompting the authorized user for a PIN (step S3-65) in order to activate the provisioned mobile payment account, as described above.

Figure 6A:
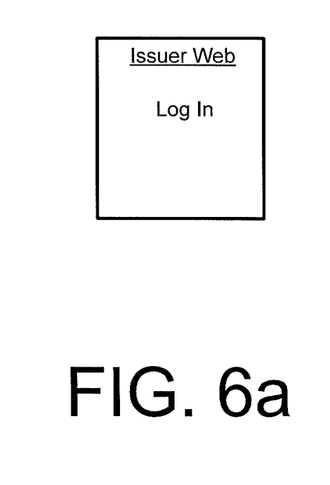
FIGS. 6a to 6d, illustrates a sequence of screens displayed by a portable device to the user during a process of adding an authorized user using a web interface according to an alternative embodiment of the present invention.
Figure 6B:
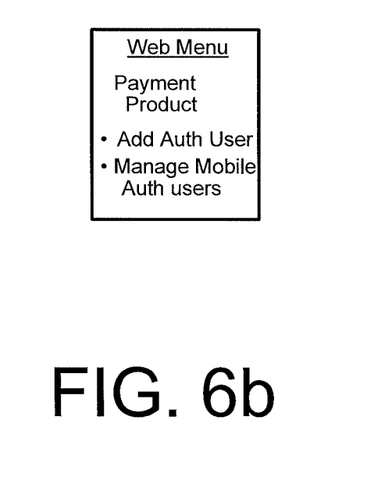
Figure 6C:
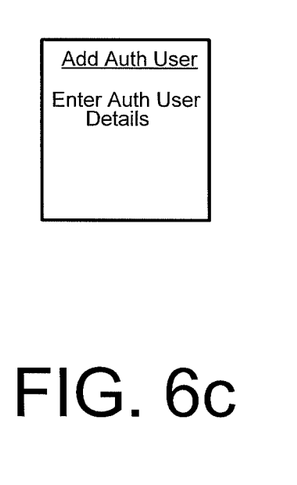
Figure 6D:
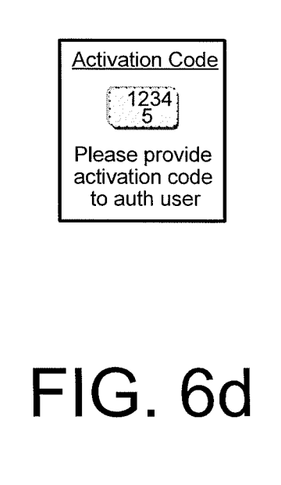

In the embodiments described above, the process of selecting an additional authorized user for a primary payment account is carried out through the wallet application module on the account owner's mobile device. It is appreciated that as an alternative the interface may instead be provided via a web interface over a secure communication channel between the mobile device and the account management system. An exemplary sequence of display screens according to this alternative embodiment is shown in FIG. 6, which comprises FIGS. 6a to 6d. FIG. 6a shows a log-in web interface display screen prompting the user to log in, and corresponds to the wallet display screen shown in FIG. 4c. FIG. 6b shows a web menu of user selectable options for servicing a particular payment account, including adding an authorized user and managing the mobile authorized users, which corresponds to the wallet display screen shown in FIG. 4d. FIG. 6c shows a web interface display screen prompting the user to enter details of the authorized user, which corresponds to step S3-15 or S3-17 discussed in the embodiments above. Finally, FIG. 6d shows a web interface display screen outputting the generated activation code, which corresponds to the wallet display screen shown in FIG. 4g.

Alternative embodiments may be envisaged, which nevertheless fall within the scope of the following claims.

What is claimed is:

1. A method for configuring an additional portable device to enable payment transactions involving an existing primary payment account at a payment account issuer, comprising:
   receiving, by a server of the payment account issuer, a data message from a first electronic wallet application module on a first portable device, the data message including a request to add an additional user who is authorized to use the primary payment account on a second portable device;
   generating, by the server, an activation code for the additional user and transmitting the activation code to the first portable device;
   transmitting to the second portable device a second electronic wallet application module comprising processing instructions to control operation of the second portable device to conduct a payment transaction using the primary payment account, said software application configured to run as a background application that activates upon receipt of a message or event; and
   transmitting, by the server, a data message or instructions to the second portable device, the data message or instructions to configure the second portable device to enable mobile payment transactions, the configuring comprising verifying, by the server, the activation code input by the additional user to the second portable device.

2. The method of claim 1, wherein the data message including the request to add the additional user comprises data identifying the additional user.

3. The method of claim 1, wherein the data message including the request to add the additional user comprises selection of a contact person from contact data stored on the first portable device, wherein the contact data includes data identifying the additional user.

4. The method of claim 3, wherein the data identifying the additional user comprises a mobile directory number.

5. The method of claim 4, wherein the request to add the additional user comprises data identifying the primary payment account and the mobile directory number for the additional user.

6. The method of claim 4, wherein the server communicates the activation code with the data for authorizing a payment transaction from the primary payment account that is stored on the second portable device, and wherein the additional user is authenticated by the second portable device based on user input of the activation code.

7. The method of claim 4, wherein the server stores data indicating a state of the first electronic wallet stored on the first portable device and the second electronic wallet stored on the second portable device.

8. The method of claim 7, wherein the state comprises an inactive state where the first electronic wallet or the second electronic wallet cannot be used to authorize a payment transaction from the primary payment account and an active state where the first electronic wallet or the second electronic wallet can be used to authorize a payment transaction from the primary payment account.

9. The method of claim 1, further comprising receiving user input sensitive information after receiving user input of the activation code at the second portable device.

10. The method of claim 1, wherein the first electronic wallet and the second electronic wallet are stored in respective secure memory elements of the first portable device and the second portable device.

11. The method of claim 1, wherein the first portable device and the second portable device are mobile handsets.

12. The method of claim 1, wherein the first portable device and the second portable device are adapted for contactless payment transactions.

13. A system for configuring an additional portable device to enable payment transactions involving an existing primary payment account at a payment account issuer, the system comprising one or more computer processors configured to:
   receive a data message from a first electronic wallet application module on a first portable device, the data message including a request to add an additional user who is authorized to use the primary payment account on a second portable device;
   generate an activation code for the additional user and transmitting the activation code to the first portable device;
   transmit to the second portable device a second electronic wallet application module comprising processing instructions to control operation of the second portable device to conduct a payment transaction using the primary payment account, said software application configured to run as a background application that activates upon receipt of a message or event; and transmit a data message or instructions to the second portable device, the data message or instructions to configure the second portable device to enable mobile payment transactions, the configuring comprising verifying, by the server, the activation code input by the additional user to the second portable device.

14. A non-transitory computer program comprising program code arranged to perform a method for configuring an additional portable device to enable payment transactions involving an existing primary payment account at a payment account issuer, when executed by respective components of a payment system, comprising:

computer-implementable instructions for receiving, by a server of the payment account issuer, a data message from a first electronic wallet application module on a first portable device, the data message including a request to add an additional user who is authorized to use the primary payment account on a second portable device;

computer-implementable instructions for generating, by the server, an activation code for the additional user and transmitting the activation code to the first portable device;

computer-implementable instructions for transmitting to the second portable device a second electronic wallet application module comprising processing instructions to control operation of the second portable device to conduct a payment transaction using the primary payment account, said software application configured to run as a background application that activates upon receipt of a message or event; and computer-implementable instructions for transmitting, by the server, a data message or instructions to the second portable device, the data message or instructions to configure the second portable device to enable mobile payment transactions, the configuring comprising verifying, by the server, the activation code input by the additional user to the second portable device.

\* \* \* \* \*